United States Patent
Liu et al.

(10) Patent No.: US 10,101,807 B2
(45) Date of Patent: Oct. 16, 2018

(54) DISTANCE ADAPTIVE HOLOGRAPHIC DISPLAYING METHOD AND DEVICE BASED ON EYEBALL TRACKING

(71) Applicant: SHENZHEN MAGIC EYE TECHNOLOGY CO., LTD., Shenzhen, Guangdong Province (CN)

(72) Inventors: Meihong Liu, Shenzhen (CN); Wei Gao, Shenzhen (CN); Wanliang Xu, Shenzhen (CN)

(73) Assignee: SHENZHEN MAGIC EYE TECHNOLOGY CO., LTD., Shenzhen (CN)

( * ) Notice: Subject to any disclaimer, the term of this patent is extended or adjusted under 35 U.S.C. 154(b) by 179 days.

(21) Appl. No.: 14/953,342

(22) Filed: Nov. 28, 2015

(65) Prior Publication Data
US 2016/0154458 A1    Jun. 2, 2016

(30) Foreign Application Priority Data
Nov. 28, 2014  (CN) .......................... 2014 1 0712422

(51) Int. Cl.
*G06F 3/01*         (2006.01)
*H04N 13/00*      (2018.01)
(Continued)

(52) U.S. Cl.
CPC ........... *G06F 3/013* (2013.01); *G03H 1/0005* (2013.01); *H04N 13/0014* (2013.01);
(Continued)

(58) Field of Classification Search
CPC ............ G03H 1/2294; G03H 2226/05; G03H 2001/2242; G03H 1/2205; G03H 2210/30;
(Continued)

(56) References Cited

U.S. PATENT DOCUMENTS

| | | | |
|---|---|---|---|
| 5,579,026 A | 11/1996 | Tabata | |
| 9,013,564 B2* | 4/2015 | Bathiche | H04N 13/0404 348/51 |
| 9,529,213 B2* | 12/2016 | Fonte | G06Q 30/0621 |
| 2010/0149313 A1 | 6/2010 | Kroll et al. | |
| 2010/0253766 A1 | 10/2010 | Mann et al. | |
| 2011/0058240 A1* | 3/2011 | Dell'Eva | G02B 5/32 359/23 |
| 2012/0062556 A1 | 3/2012 | Yamamoto et al. | |
| 2013/0235073 A1* | 9/2013 | Jaramillo | G09G 5/00 345/619 |
| 2014/0168734 A1* | 6/2014 | Dell'Eva | G02B 5/32 359/3 |
| 2014/0306954 A1 | 10/2014 | Kao | |
| 2014/0333735 A1* | 11/2014 | Bathiche | H04N 13/0404 348/54 |
| 2015/0055085 A1* | 2/2015 | Fonte | G06Q 30/0621 351/178 |
| 2015/0138613 A1* | 5/2015 | Choo | G02B 27/0093 359/9 |
| 2016/0048018 A1* | 2/2016 | De Matos Pereira Vieira | G02B 27/0103 348/53 |
| 2016/0062152 A1* | 3/2016 | Fonte | G06Q 30/0621 351/204 |

(Continued)

FOREIGN PATENT DOCUMENTS

CN        103018915 A      4/2013
WO     2013/107467 A1    7/2013

*Primary Examiner* — Dave Czekaj
*Assistant Examiner* — Kehinde O Abimbola

(57) ABSTRACT

A distance adaptive holographic displaying method and device based on eyeball tracking are disclosed. The method includes: detecting a human face of a user and acquiring positions of eyes of the user, wherein the positions of the eyes of the user comprise a distance between the eyes and a displaying screen; adjusting the size of an object in a holographic scene along a z-axis direction in the holographic three-dimensional display according to the distance, and displaying the object in the displaying screen; adjusting an emergent direction of the light emitted by the displaying screen to the direction of the left eye and the right eye of the eyes so that the different individual holographic three-dimensional images of the left eye and the right eye are imaged into the left eye and the right eye respectively; and tracking the change of the positions of the eyes, and repeat- (Continued)

ing the aforesaid steps to dynamically adjust viewpoints and the displayed content. The present disclosure can adapt to different groups of people at different distances and conform to the visual principle of human beings, thereby improving user experiences.

10 Claims, 9 Drawing Sheets

(51) Int. Cl.
 *G03H 1/00* (2006.01)
 *H04N 13/04* (2006.01)
(52) U.S. Cl.
 CPC ..... *H04N 13/0475* (2013.01); *H04N 13/0477* (2013.01); *H04N 13/0484* (2013.01); *G03H 2001/0088* (2013.01); *G03H 2210/30* (2013.01); *H04N 13/0409* (2013.01)

(58) Field of Classification Search
 CPC ........ G03H 1/02; G03H 1/22; G03H 2223/18; G03H 2223/19; G03H 2222/34; G03H 2225/55; G03H 1/0005; G03H 1/2286; G03H 2001/008; H04N 13/0022; H04N 13/0409; H04N 13/0239; H04N 9/3147; H04N 13/0033; H04N 13/0055; H04N 13/007; H04N 13/0207; H04N 13/0468; H04N 13/0018; H04N 13/0059; H04N 13/026; H04N 13/0418
 See application file for complete search history.

(56) References Cited

U.S. PATENT DOCUMENTS

2017/0068121 A1\* 3/2017 Fonte ................. G06Q 30/0621
2017/0269385 A1\* 9/2017 Fonte ................. G06Q 30/0621

\* cited by examiner

DISTANCE ADAPTIVE HOLOGRAPHIC DISPLAYING METHOD AND DEVICE BASED ON EYEBALL TRACKING

FIELD

The present disclosure generally relates to the technical field of individual holographic display, and more particularly, to a distance adaptive holographic displaying method and device based on eyeball tracking.

BACKGROUND

Nowadays, owing to development and advancement of the electronic technologies and improvement of user requirements, hardware indices and technical indices are no longer the only standard for judging whether an electronic product is good or bad, and the key to win in the market for manufacturers is to pay more attention to user experiences and feelings.

Many existing electronic products, e.g., mobile phones, tablet computers, and game machines or the like, can operate correspondingly according to actions of users. For example, the electronic product can change the displaying angle of the displaying screen automatically when a user moves, switch the current interface, song or video when the user shakes the body of the electronic product, move the images on the displaying screen accordingly when the user inclines the body of the electronic product, and control the direction of a car displayed on the displaying screen in a racing game when the user swings the body of the electronic product from the left side to the right side.

In the prior art, the aforesaid functions are usually achieved on the basis of the gravity sensing principle, i.e., an internal gravity sensing chip is utilized to determine actions of the user. The drawback of the gravity sensing lies in that the product can only be used within the gravity range, and the functions will be lost when the product is out of the gravity orientation.

BRIEF DESCRIPTION OF THE DRAWINGS

Implementations of the present technology will now be described, by way of example only, with reference to the attached figures, wherein.

DETAILED DESCRIPTION

Figure 1:
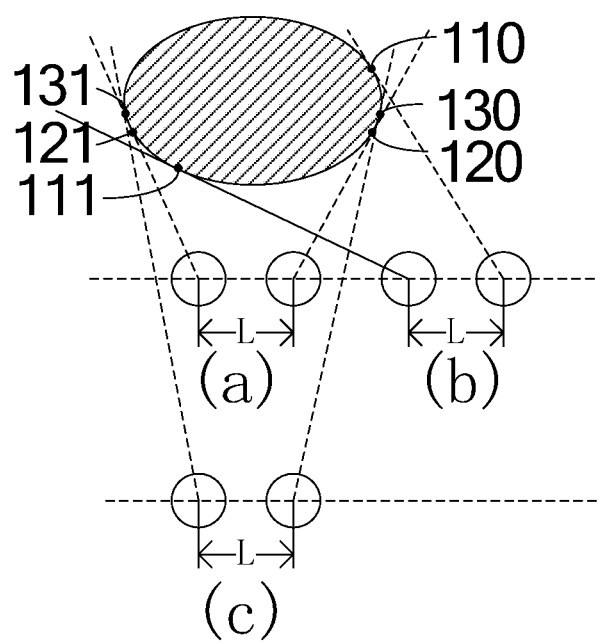
FIG. 1 is a schematic view illustrating the principle that different distances between human eyes and a displaying screen will result in different viewing angles and different regions of the object covered by the sight of the eyes, in a distance adaptive holographic displaying method based on eyeball tracking according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

To ensure normal implementation of the present disclosure, the device of the present disclosure is a device capable of adjusting viewpoints of a holographic three-dimensional display. Usually, devices of a same version may be used by different groups of different ages, a same group of different ages, and a same group of a same age. Because distances between the two eyes of these groups of people are usually different and viewing positions of these groups of people are also different, the imaging size of the object on the eyes of these groups of people varies and the region of the object covered by the sight of these groups of people also varies. For example, referring to FIG. 1, FIG. 1 is a schematic view illustrating the principle that different distances between human eyes and a displaying screen will result in different viewing angles and different regions of the object covered by the sight of the eyes, in a distance adaptive holographic displaying method based on eyeball tracking according to a first embodiment of the present disclosure. At a position a, a user of which the interval between eyes is L observes an object, and at this point, the region of the object covered by the sight of the user is an area facing the user between a tangency point 121 from the center of a left eye to a left side of the object and a tangency point 120 from the center of a right eye to a right side of the object; at a position b that is at a same distance from the displaying screen as the position a but at a different angle, the user of which the interval between eyes is L observes the same object, and at this point, the region of the object covered by the sight of the user is an area facing the user between a tangency point 111 from the center of the left eye to the left side of the object and a tangency point 110 from the center of the right eye to the right side of the object; and at a position c farther from the displaying screen than the position a, the user of which the interval between eyes is L observes the same object, and at this point, the region of the object covered by the sight of the user is an area facing the user between a tangency point 131 from the center of the left eye to the left side of the object and a tangency point 130 from the center of the right eye to the right side of the object. The region of the object covered by the sight of the eyes of the user at the position c is larger than the region of the object covered by the sight of the eyes of the user at the position a.

Figure 2:
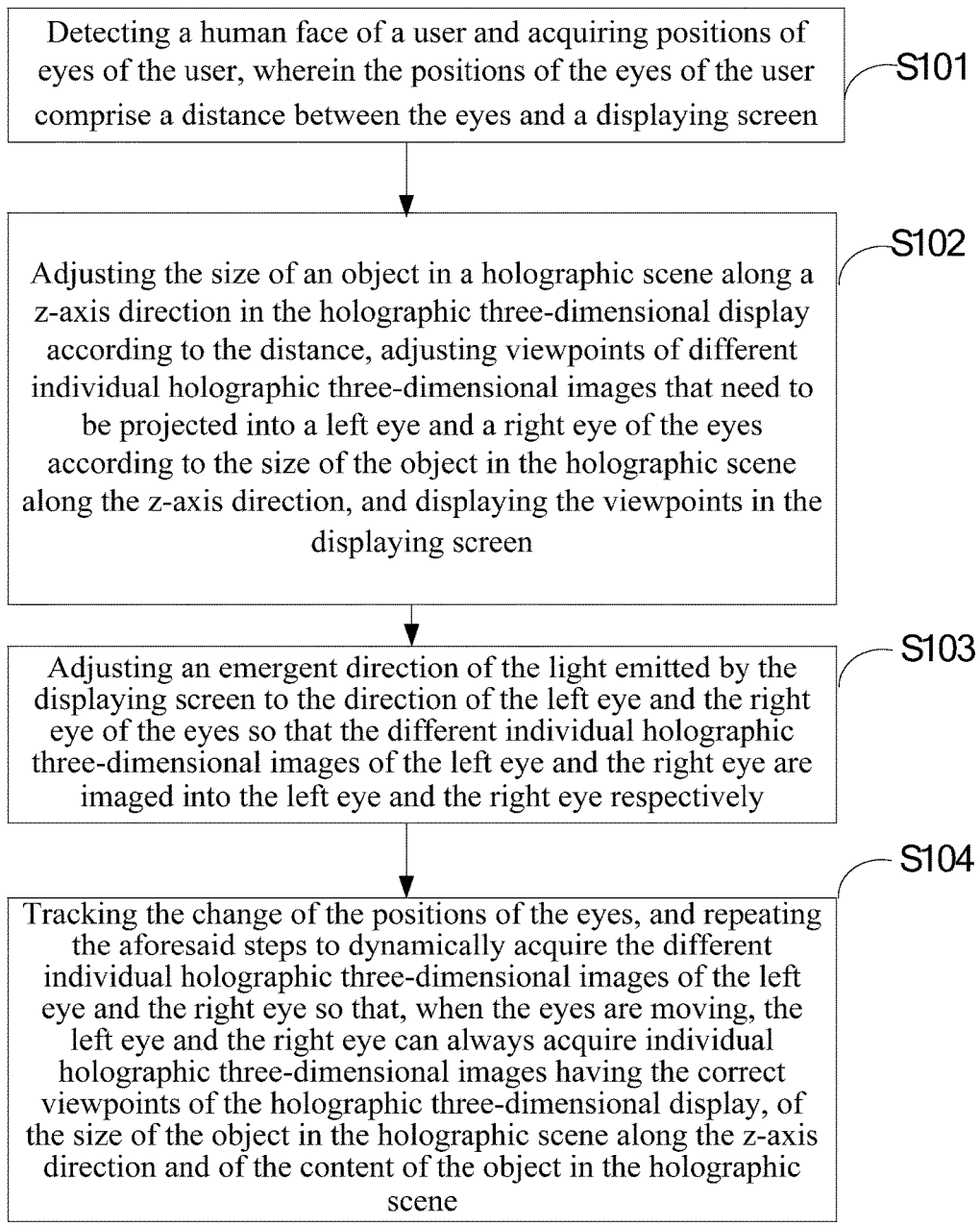
FIG. 2 is a schematic flowchart diagram of the distance adaptive holographic displaying method based on eyeball tracking according to the first embodiment of the present disclosure.
Figure 3A:
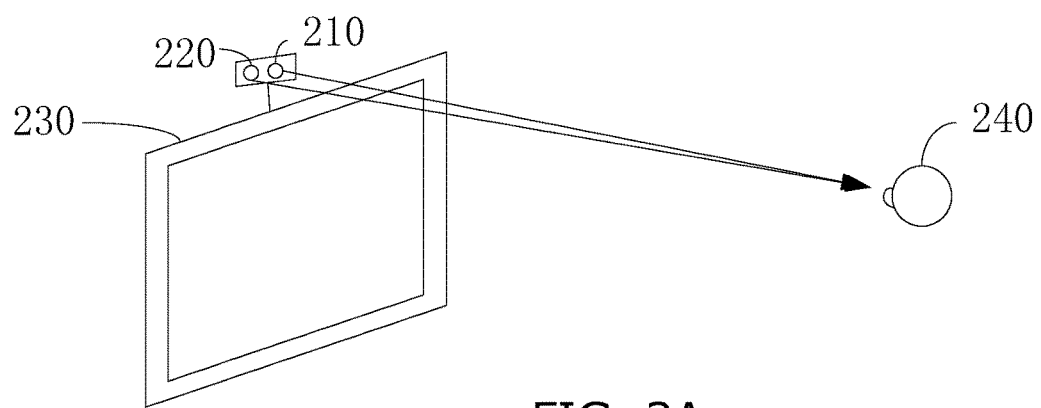
FIGS. 3A and 3B are schematic views illustrating human eyes tracking and distance measuring in the distance adaptive holographic displaying method based on eyeball tracking according to the first embodiment of the present disclosure.
Figure 3B:
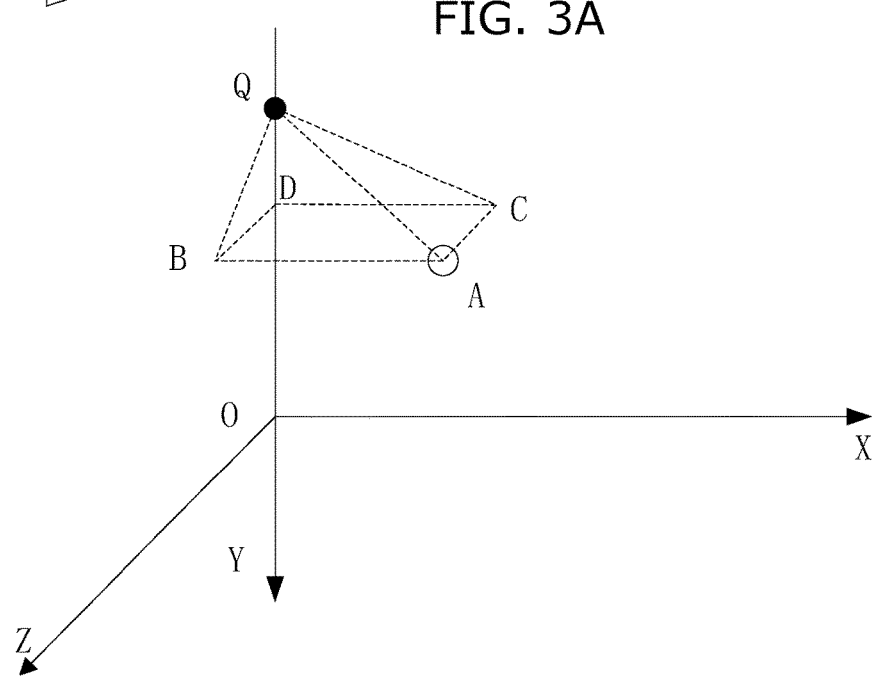

Please refer to FIG. 2, FIGS. 3A and 3B together. FIG. 2 is a schematic flowchart diagram of the distance adaptive holographic displaying method based on eyeball tracking according to the first embodiment of the present disclosure. FIGS. 3A and 3B are schematic views illustrating human eyes tracking and distance measuring in the distance adaptive holographic displaying method based on eyeball tracking according to the first embodiment of the present disclosure. The method comprises the following steps:

S101: detecting a human face of a user and acquiring positions of eyes of the user, wherein the positions of the eyes of the user comprise a distance between the eyes and a displaying screen.

Figure 10:
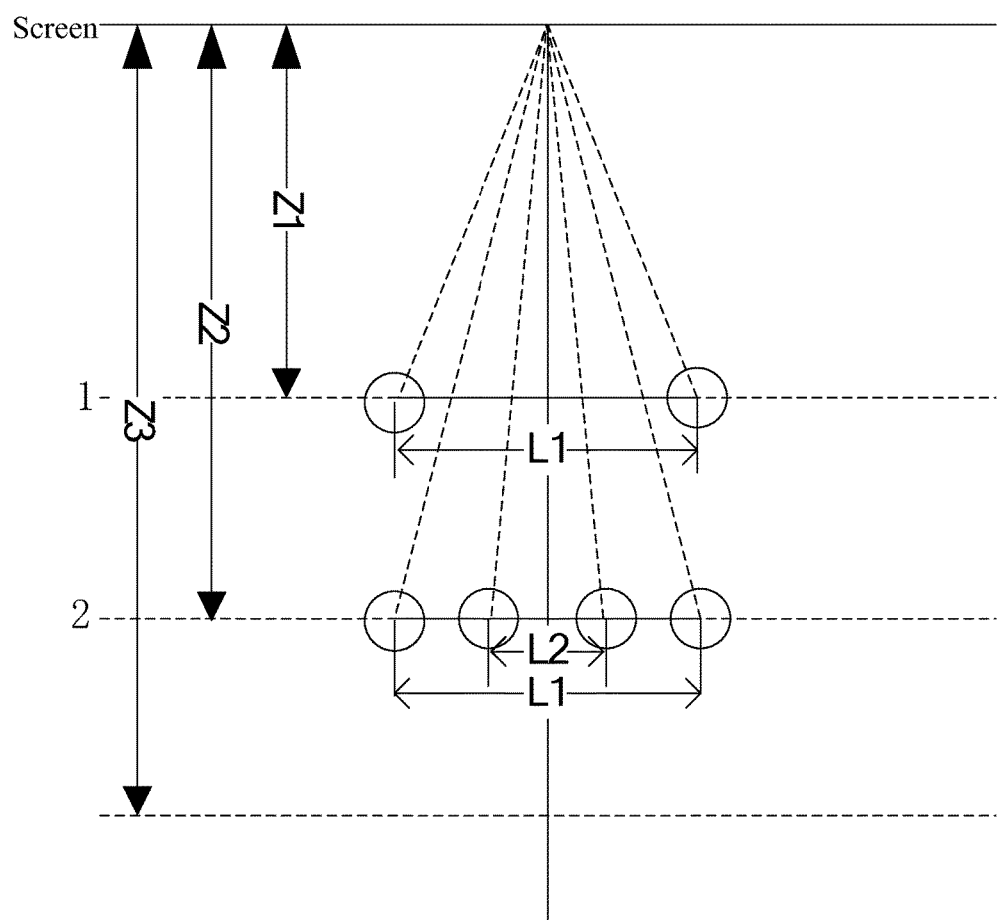
FIG. 10 is a schematic view illustrating the change of coordinates of positions of human eyes in the distance adaptive holographic displaying method based on eyeball tracking of the present disclosure.

A three-dimensional standard coordinate system is established by taking the center of the displaying screen as an origin, with the xy coordinate plane being parallel to the displaying screen, the positive x-axis direction being horizontal and directed towards the right, the positive y-axis direction being vertical to the x-axis and directed downwards, and the positive z-axis direction being directed towards the direction of the human eyes. In practical implementations, the space coordinate system may also be established by taking other positions (e.g., a lower left corner or an upper left corner of the displaying screen) as the origin and other directions as the positive directions. For example, in FIG. 3A, a human face tracking camera 210 and a distance meter 220 are mounted on a display 230 or at positions near the displaying screen (e.g., on a host machine or a desktop). It is assumed that in this embodiment, the distance meter 220 is an infrared distance meter and is located on the y-axis of the coordinate system. In this embodiment, the distance meter 220 and the camera 210 are fixedly disposed at adjacent positions with respect to each other. In this way, when the camera 210 moves or remains still in response to the change in the viewing position of the user, the distance meter 220 can be driven to rotate simultaneously so as to make it convenient for the distance meter 220 to find the positions of the human eyes rapidly. Of course, the distance meter 220 may also not rotate. In practical implementations, the distance meter 220 and the camera 210 may also be disposed separately, and the infrared distance meter used in this embodiment may also be replaced by other devices having similar functions. The face recognition technology may be adopted to detect a human face of the user and acquire the positions of the eyes of the user firstly, then the positions can be transformed into corresponding coordinates according to the established coordinate system, and the distance meter 220 is activated to measure a distance between the human eyes and the distance meter 220 and an angle of an optical axis of the infrared distance meter with respect to a plane of the displaying screen. As shown in FIG. 3B, a point Q represents the infrared distance meter 220, a point A represents a human eye, and a coordinate of the point A in the xy plane of the coordinate system is acquired according to data obtained by the camera 210 and the coordinate system. A point B represents the projection of the human eye A in the yz plane, and a point C represents the projection of the human eye A in the xy plane. A distance QA between the human eye and the infrared distance meter 220 and an angle ∠AQC included between the optical axis QA of the infrared distance meter 220 and a plane (xy plane) of the displaying screen are measured by the infrared distance meter 220. Because the point B and the point C represent projections of the human eye A on the yz plane and the xy plane respectively, a triangle AQC formed by coordinates of the point A, the point Q (i.e., the infrared distance meter) and the point C is a right triangle. According to the nature of the right triangle, the distance Z between the eyeball A and the displaying screen is as follows: Z=AC=QA*sin ∠AQC. As the human eyes are at different positions, the coordinates of the eyes are $(x_{L1}, y_{L1})$, and $(x_{R1}, y_{R1})$, $(x_{L2}, y_{L2})$ and $(x_{R2}, y_{R2})$, ..., $(x_{Ln}, y_{Ln})$ and $(x_{Rn}, y_{Rn})$ respectively when the eyes move from the position 1 to the position n, wherein L represents the left eye and R represents the right eye. Different distances Z1, Z2, ... Zn are measured by the infrared distance meter when the eyes are moving, and the distances between the eyes and the displaying screen can be acquired in the aforesaid way. Distances L1, L2, ... Ln between the two eyeballs are obtained according to coordinate values corresponding to the eyeballs, and each of the angles θ1, θ2, ..., θn can be calculated according to the coordinate values corresponding to the eyeballs and the distances between the eyeballs when the eyes are moving. Referring to FIG. 10, generally when the user is watching the displaying screen, the line connecting a midpoint between the both human eyes to the viewpoint on the displaying screen is substantially perpendicular to the line connecting the both human eyes. According to the nature of the right triangle, the angle θ can be calculated by the following formula:

$$\theta = \frac{2 \arctan L}{2Z}$$

where L is the distance between the both eyes, and Z is the distance between the eyes and the displaying screen 230.

In one embodiment, the objective of this step may also be achieved in other ways to acquire the distance between the human eyes and the displaying screen 230, e.g., by directly taking the distance between the infrared distance meter and the eyes as the distance Z between the eyes and the displaying screen 230, or by calculating the distance Z between the eyes and the displaying screen 230 through use of the coordinates of the distance meter and the eyes in the established coordinate system according to the nature of the right triangle.

S102: adjusting the size of an object in a holographic scene along a z-axis direction in the holographic three-dimensional display according to the distance, adjusting viewpoints of different individual holographic three-dimensional images that need to be projected into a left eye and a right eye of the eyes according to the size of the object in the holographic scene along the z-axis direction, and displaying the viewpoints in the displaying screen.

Generally, when a human is far away from an object, the image of the object on the human eyes is relatively small; and when the human is next to the object, the image of the object on the human eyes is relatively large. That is, the closer the object is to the human eyes, the larger the image of the object on the human eyes is. For example, when we look down from a tall building, people on the ground seem very small, and may be just as small as ants that we see when we are standing on the ground. Referring to FIG. 1 together, FIG. 1 is a schematic view illustrating the principle that different distances between human eyes and a displaying screen will result in different viewing angles and different regions of the object covered by the sight of the eyes, in an individual holographic three-dimensional displaying method according to a first embodiment of the present disclosure. At the position c farther from the displaying screen than the position a, the user of which the interval between eyes is L observes the same object, and at this point, the region of the object covered by the sight of the user is an area facing the user between a tangency point 131 from the center of the left eye to the left side of the object and a tangency point 130 from the center of the right eye to the right side of the object. The region of the object covered by the sight of the eyes of the user at the position c is larger than the region of the object covered by the sight of the eyes of the user at the position a.

The size of an object in a holographic scene along a z-axis direction in the holographic three-dimensional display and the region of the object that can be covered by the sight of the human eyes are adjusted according to the distance between the human eyes and the displaying screen acquired in the step S101. For example, referring to FIG. 10, when a user moves from the position 1 (at a distance Z1 from the displaying screen) to the position 2 (at a distance Z2 from the displaying screen) farther from the displaying screen than the position 1, the size of the object in the holographic scene along the z-axis direction in the holographic three-dimensional display is reduced, and the region of the object in the holographic scene in the holographic three-dimensional display that can be covered by the sight of the both human eyes is enlarged; and when the user moves from the position 3 (at a distance Z3 from the displaying screen) to the position 2 (at the distance Z2 from the displaying screen) closer to the displaying screen than the position 3, the size of the object in the holographic scene along the z-axis direction in the holographic three-dimensional display is enlarged, and the region of the object in the holographic scene in the holographic three-dimensional display that can be covered by the sight of the both human eyes is reduced. The viewpoints of different individual holographic three-dimensional images that need to be projected into a left eye and a right eye of the eyes are adjusted according to the size of the object in the holographic scene along the z-axis direction and the region of the object that can be covered by the sight of the human eyes, and the viewpoints are displayed in the displaying screen.

S103: adjusting an emergent direction of the light emitted by the displaying screen to the direction of the left eye and the right eye of the eyes so that the different individual holographic three-dimensional images of the left eye and the right eye are imaged into the left eye and the right eye respectively.

A dynamic grating in the display is controlled according to the viewpoints of different individual holographic three-dimensional images of the left eye and the right eye of the eyes acquired in the step S102 so that positions of light and dark strips of the grating change adaptively. That is, the emergent direction of the light emitted by the displaying screen is adjusted to the direction of the left eye and the right eye of the eyes so that the different individual holographic three-dimensional images of the left eye and the right eye are imaged into the left eye and the right eye respectively through the dynamic grating.

S104: tracking the change of the positions of the eyes, and repeating the aforesaid steps to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction.

The change of the positions of the eyes is tracked according to the angle included between the line connecting the eyes to the center of the displaying screen and a normal line of the displaying screen as well as the distance Z between the eyes and the displaying screen when the eyes are moving that are acquired in the step S101. Referring to FIG. 10 together, FIG. 10 is a schematic view illustrating the change of coordinates of positions of human eyes in the individual holographic three-dimensional displaying method of the present disclosure. When the user is at the position 1 at the distance Z1 from the displaying screen, the individual holographic three-dimensional images of the size of the object in the holographic scene along the z-axis direction are adjusted according to the different individual holographic three-dimensional images of the left eye and right eye and the content of the object in the holographic scene that are acquired in the steps S101 to S103. At the position 2 at the distance Z2 from the displaying screen, the user of which the interval between eyes is L1 and the user at the position 1 are a same user, and the user of which the interval between eyes is L2 and the user at the position 1 are users of different groups or ages; and in this case, the steps S101 to S103 are repeated to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction. For example, at the position at the distance Z2 from the displaying screen, corresponding adjusted viewpoints are acquired and the size of the object in the holographic scene along the z-axis direction and the content of the object in the holographic scene are adjusted by executing the aforesaid steps for the users, of which the intervals between eyes are L1 and L2 respectively, so that the displaying screen can adapt to users of different ages and groups having different intervals between eyes.

In this embodiment, when the camera tracks the change of the positions of the human eyes, the distance meter will be driven to move together so that the distance between the eyes and the displaying screen can be calculated according to the change of the positions dynamically measured by the distance meter and the angle included between the distance meter and the displaying screen. Meanwhile, according to the visual principle that the object looks smaller when you observe it at a larger distance and looks larger when you observe it at a smaller distance, the viewpoints of the holographic three-dimensional display are acquired and the size of the object in the holographic scene along the z-axis direction is adjusted in real time according to the change of the data. Thus, the displaying screen can adapt to users of different groups at different distances, thereby improving user experiences.

Figure 4:
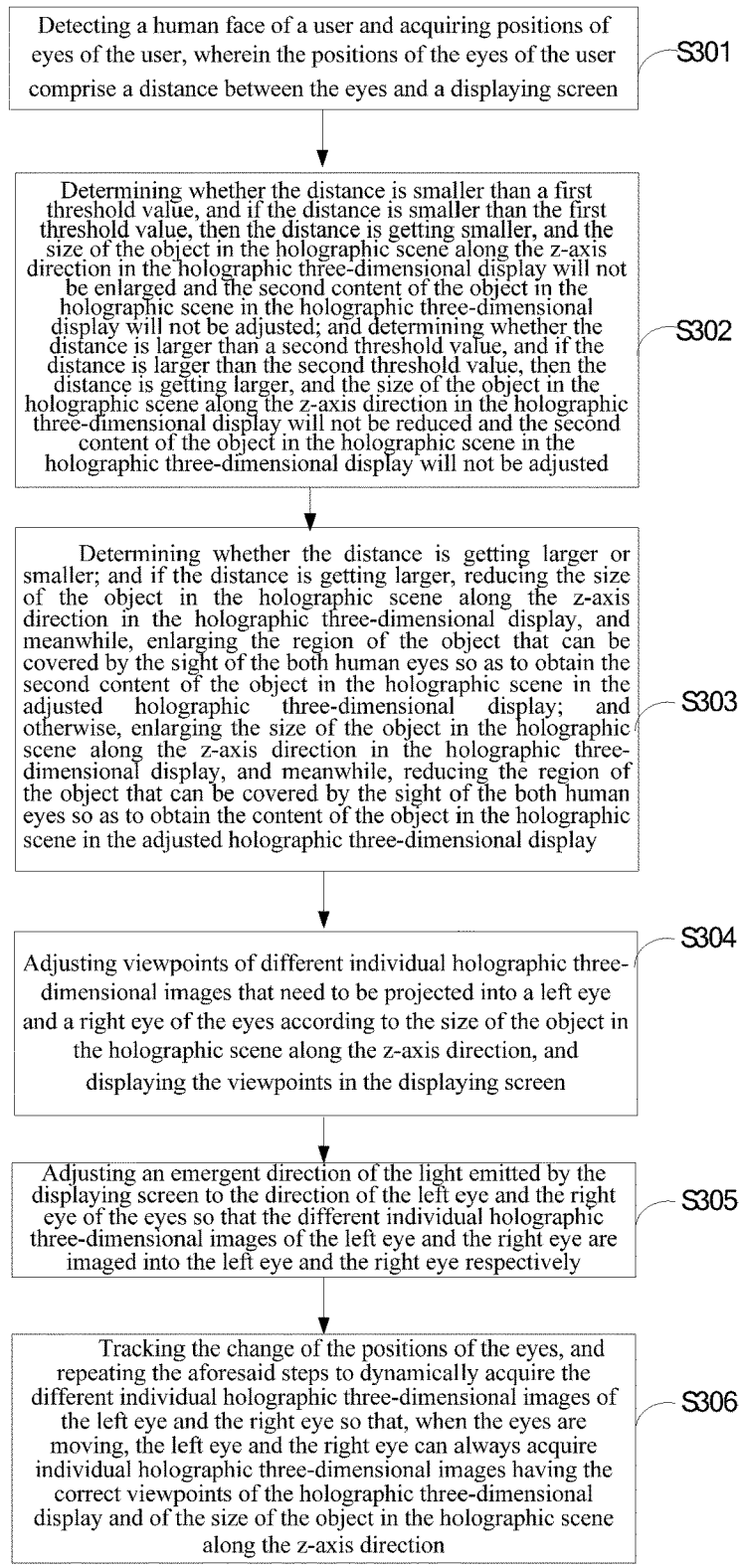
FIG. 4 is a schematic flowchart diagram of a distance adaptive holographic displaying method based on eyeball tracking according to a second embodiment of the present disclosure.

Referring to FIG. 4, FIG. 4 is a schematic flowchart diagram of a distance adaptive holographic displaying method based on eyeball tracking according to a second embodiment of the present disclosure. The method comprises the following steps of:

S301: detecting a human face of a user and acquiring positions of eyes of the user, wherein the positions of the eyes of the user comprise a distance between the eyes and a displaying screen.

Figure 5A:
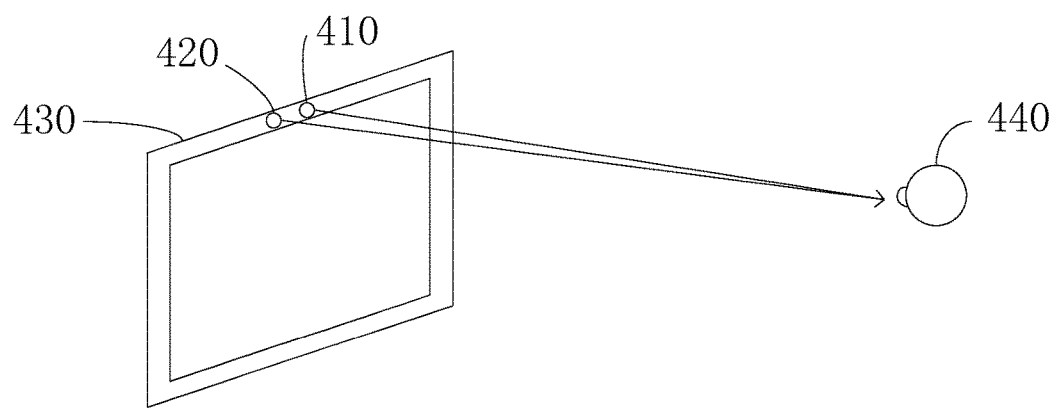
FIGS. 5A and 5B are schematic views illustrating human eyes tracking and distance measuring in the distance adaptive holographic displaying method based on eyeball tracking according to the second embodiment of the present disclosure.
Figure 5B:
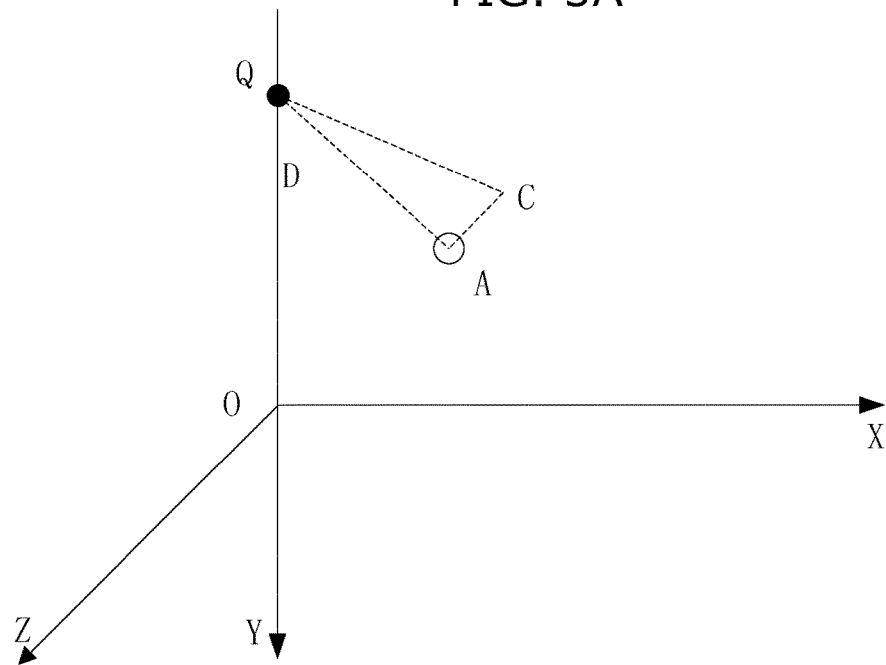

A three-dimensional standard coordinate system is established by taking the center of the displaying screen as an origin, with the xy coordinate plane being parallel to the displaying screen, the positive x-axis direction being horizontal and directed towards the right, the positive y-axis direction being perpendicular to the x-axis and directed downwards, and the positive z-axis direction being directed towards the direction of the human eyes. In practical implementations, the space coordinate system may also be established by taking other positions (e.g., a lower left corner of the displaying screen) as the origin. Referring to FIGS. 5A and 5B together, FIGS. 5A and 5B are schematic views illustrating eyes tracking and distance measuring in the distance adaptive holographic displaying method based on eyeball tracking according to the second embodiment of the present disclosure. For example, in FIG. 5A, a human face tracking camera 410 and a distance meter 420 are mounted on a display 430 or a host machine separately. The human face tracking camera 410 and the distance meter 420 are disposed symmetrically with respect to the y-axis so that when the human face tracking camera 410 tracks and captures a human face, the distance meter 420 can also locate the human eyes rapidly according to the symmetrical relationships. In one embodiment, the human face tracking camera 410 and the distance meter 420 may also be disposed asymmetrically. The following positions of the eyes in the coordinate system are acquired according to data obtained by detecting the human face by the human face tracking camera 410 and the space coordinate system: $(x_{L1}, y_{L1})$ and $(x_{R1}, y_{R1})$, $(x_{L2}, y_{L2})$ and $(x_{R2}, y_{R2})$, . . . , $(x_{Ln}, y_{Ln})$ and $(x_{Rn}, y_{Rn})$, where L represents the left eye, R represents the right eye, and n represents that the eyes move from position 1 to position n. Then, the coordinate of the distance meter 420 is adjusted so as to measure the distance between the human eyes and the distance meter 420. The distance Z between the human eyes and the displaying screen is calculated according to the nature of the right triangle as follows:

$$Z = \sqrt{QA^2 - QC^2}.$$

In practical implementations, generally when the user is watching the displaying screen, the line connecting the center of the face of the user to the center of the displaying screen is parallel to the z-axis of the coordinate system; and when the user moves at different positions, the distance between the infrared distance meter and the eyes can be taken directly as the distance Z between the eyes and the displaying screen.

S302: determining whether the distance is smaller than a first threshold value, and if the distance is smaller than the first threshold value, then the distance is getting smaller, and the size of the object in the holographic scene along the z-axis direction in the holographic three-dimensional display will not be enlarged; and determining whether the distance is larger than a second threshold value, and if the distance is larger than the second threshold value, then the distance is getting larger, and the size of the object in the holographic scene along the z-axis direction in the holographic three-dimensional display will not be reduced.

If the distance between the user and the displaying screen is too small, the eyesight and the visual effect may be compromised; and if the distance between the user and the displaying screen is too large, the user maybe cannot watch the screen clearly. In order to avoid the aforesaid problem, an optimal viewing range is set to ensure the visual effect. Adjusting the size of an object in a holographic scene along a z-axis direction in the holographic three-dimensional display according to the distance further comprises adjusting the content of the object in the holographic scene in the holographic three-dimensional display, wherein the content of the object in the holographic scene is the appearance content of the object within the region of the object that can be covered by the sight of the both human eyes. Before the step of adjusting the size of an object in a holographic scene along a z-axis direction, a step is executed to determine whether the distance between the eyes and the displaying screen is smaller than a first threshold value, and if the distance is smaller than the first threshold value, then the distance is getting smaller, and the size of the object in the holographic scene along the z-axis direction in the holographic three-dimensional display will not be enlarged; and to determine whether the distance is larger than a second threshold value, and if the distance is larger than the second threshold value, then the distance is getting larger, and the size of the object in the holographic scene along the z-axis direction in the holographic three-dimensional display will not be reduced. The first threshold value is the minimum distance within the optimal viewing range, and the second threshold value is the maximum distance within the optimal viewing range.

S303: determining whether the distance is getting larger or smaller; and if the distance is getting larger, reducing the size of the object in the holographic scene along the z-axis direction in the holographic three-dimensional display, and meanwhile, enlarging the region of the object that can be covered by the sight of the both human eyes so as to obtain the second content of the object in the holographic scene in the adjusted holographic three-dimensional display; and otherwise, enlarging the size of the object in the holographic scene along the z-axis direction in the holographic three-dimensional display, and meanwhile, reducing the region of the object that can be covered by the sight of the both human eyes so as to obtain the content of the object in the holographic scene in the adjusted holographic three-dimensional display.

When the distance between the user and the displaying screen is within the preset optimal viewing range, it is determined whether the distance is getting larger or smaller. If the distance is getting larger, then the size of the object in the holographic scene along the z-axis direction in the holographic three-dimensional display is reduced; and otherwise, the size of the object in the holographic scene along the z-axis direction in the holographic three-dimensional display is enlarged. Adjusting the size of an object in a holographic scene along a z-axis direction in the holographic three-dimensional display according to the viewing distance of the user further comprises adjusting the content of the object in the holographic scene in the holographic three-dimensional display, wherein the content of the object in the holographic scene is the appearance content of the object within the region of the object that can be covered by the sight of the both human eyes. This conforms to the visual principle that an object seems big when we are close to it and seems small when we are far away from it, and the region of the object that can be covered by the sight of the human eyes varies when we observe the object at different distances. For example, referring to FIG. 1, at the position a, a user of which the interval between eyes is L observes an object, and at this point, the region of the object covered by the sight of the user is an area facing the user between a tangency point 121 from the center of the left eye to the left side of the object and a tangency point 120 from the center of the right eye to the right side of the object; and at the position c farther from the displaying screen than the position a, the user of which the interval between eyes is L observes the same object, and at this point, the region of the object covered by the sight of the user is an area facing the user between a tangency point 131 from the center of the left eye to the left side of the object and a tangency point 130 from the center of the right eye to the right side of the object. The region of the object covered by the sight of the human eyes at the position c is larger than the region of the object covered by the sight of the human eyes at the position a, and the image of the object on the eyes at the position c is smaller than the image of the object on the eyes at the position a.

S304: adjusting viewpoints of different individual holographic three-dimensional images that need to be projected into a left eye and a right eye of the eyes according to the size of the object in the holographic scene along the z-axis direction and the content of the object in the holographic scene, and displaying the viewpoints in the displaying screen.

S305: adjusting an emergent direction of the light emitted by the displaying screen to the direction of the left eye and the right eye of the eyes so that the different individual holographic three-dimensional images of the left eye and the right eye are imaged into the left eye and the right eye respectively.

The steps S304 and S305 are similar to the steps S102 and S103 in the aforesaid first embodiment and thus will not be further described herein. The viewpoints of different individual holographic three-dimensional images that need to be projected into a left eye and a right eye of the eyes are adjusted according to the size of the object in the holographic scene along the z-axis direction and the content of the object in the holographic scene acquired according to the steps S301 to S303, and the viewpoints are displayed in the displaying screen. The content of the object in the holographic scene is the content of the object covered by the sight of the both human eyes, and for this, reference may be made to FIG. 1 and the description thereof, so this will not be further described herein. When the eyes are close to the displaying screen, the size of the object in the holographic scene along the z-axis direction is enlarged and the region of the object in the holographic scene in the holographic three-dimensional display that can be covered by the sight of the human eyes is reduced adaptively, e.g., an object that is in the front of the holographic scene is enlarged, the enlarged object in the front blocks the sight of the content at the back, and the region of the object in the holographic scene in the holographic three-dimensional display that can be covered by the sight of the human eyes is reduced. When the eyes are far away from the displaying screen, the size of the object in the holographic scene along the z-axis direction is reduced and the region of the object in the holographic scene in the holographic three-dimensional display that can be covered by the sight of the human eyes is enlarged adaptively, e.g., the object that is in the front of the holographic scene is reduced more rapidly than the object at the back of the holographic scene, then the blocked content will show up again, and the region of the object in the holographic scene in the holographic three-dimensional display that can be covered by the sight of the human eyes is enlarged.

S306: tracking the change of the positions of the eyes, and repeating the aforesaid steps to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction.

The camera tracks the change of the positions of the eyes in real time, and the aforesaid steps are repeated to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction.

In this embodiment, the distance between the human eyes and the displaying screen is calculated according to the coordinates of the distance meter and the eyes, or the distance between the distance meter and the eyes is directly taken as the distance Z between the human eyes and the displaying screen. When the user is within the optimal viewing distance, the size of the object in the holographic scene along the z-axis direction in the holographic three-dimensional display is reduced if the distance is getting larger; and otherwise, the size of the object in the holographic scene along the z-axis direction in the holographic three-dimensional display is enlarged. Meanwhile, according to the visual principle that the region of the object covered by the sight of the eyes varies when the user observes the object at different positions, the content of the object in the holographic scene is adjusted and the correct viewpoints of the holographic three-dimensional display is acquired so as to provide optimal visual effect to different groups of people.

Figure 6:
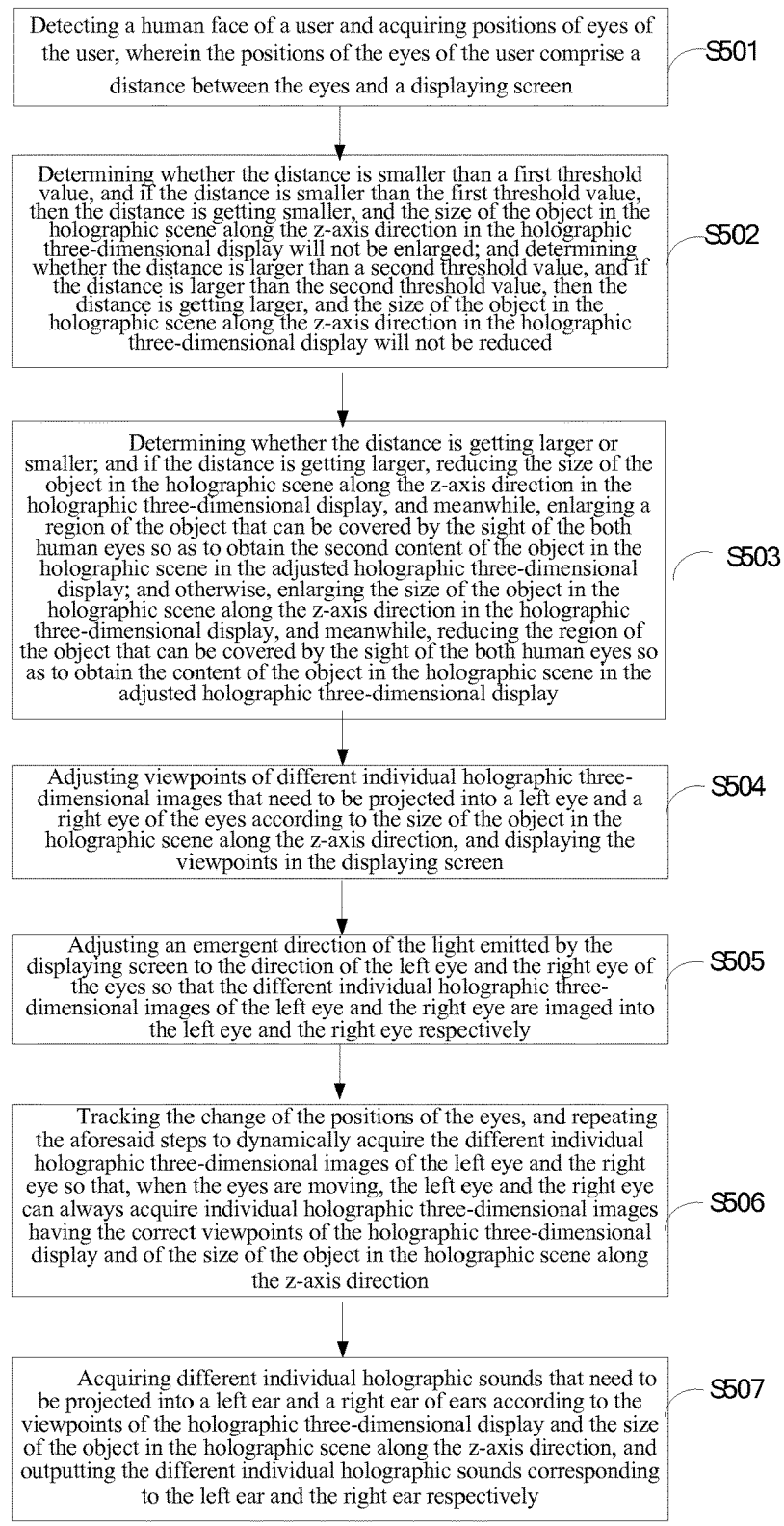
FIG. 6 is a schematic flowchart diagram of a distance adaptive holographic displaying method based on eyeball tracking according to a third embodiment of the present disclosure.

Referring to FIG. 6, FIG. 6 is a schematic flowchart diagram of a distance adaptive holographic displaying method based on eyeball tracking according to a third embodiment of the present disclosure. The present disclosure provides an individual holographic three-dimensional displaying method which comprises the following steps of:

S501: detecting a human face of a user and acquiring positions of eyes of the user, wherein the positions of the eyes of the user comprise a distance between the eyes and a displaying screen.

S502: determining whether the distance is smaller than a first threshold value, and if the distance is smaller than the first threshold value, then the distance is getting smaller, and the size of the object in the holographic scene along the z-axis direction in the holographic three-dimensional display will not be enlarged; and determining whether the distance is larger than a second threshold value, and if the distance is larger than the second threshold value, then the distance is getting larger, and the size of the object in the holographic scene along the z-axis direction in the holographic three-dimensional display will not be reduced.

S503: determining whether the distance is getting larger or smaller; and if the distance is getting larger, reducing the size of the object in the holographic scene along the z-axis direction in the holographic three-dimensional display, and meanwhile, enlarging the region of the object that can be covered by the sight of the both human eyes so as to obtain the second content of the object in the holographic scene in the adjusted holographic three-dimensional display; and otherwise, enlarging the size of the object in the holographic scene along the z-axis direction in the holographic three-dimensional display, and meanwhile, reducing the region of the object that can be covered by the sight of the both human eyes so as to obtain the content of the object in the holographic scene in the adjusted holographic three-dimensional display.

S504: adjusting viewpoints of different individual holographic three-dimensional images that need to be projected into a left eye and a right eye of the eyes according to the size of the object in the holographic scene along the z-axis direction, and displaying the viewpoints in the displaying screen.

S505: adjusting an emergent direction of the light emitted by the displaying screen to the direction of the left eye and the right eye of the eyes so that the different individual holographic three-dimensional images of the left eye and the right eye are imaged into the left eye and the right eye respectively.

S506: tracking the change of the positions of the eyes, and repeating the aforesaid steps to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction.

The steps S501 to S506 are similar to the steps S301 to S306 in the aforesaid first embodiment, and the specific implementation of the step S501 may be similar to that of the step S101 in the first embodiment and thus will not be further described herein.

S507: acquiring different individual holographic sounds that need to be projected into a left ear and a right ear of ears according to the viewpoints of the holographic three-dimensional display and the size of the object in the holographic scene along the z-axis direction, and outputting the different individual holographic sounds corresponding to the left ear and the right ear respectively.

To improve the visual effect, different individual holographic sounds that need to be projected into a left ear and a right ear of ears are acquired according to the size of the object in the holographic scene along the z-axis direction, and different individual holographic sounds corresponding to the left ear and the right ear are output respectively. The sound at a side of the displaying screen that is closer to the user is amplified, while the sound at the other side of the displaying screen that is far away from the user is reduced. For example, when the user is at the right side of the displaying screen, the right channel volume is amplified and the left channel volume is reduced; when the user is at the left side of the displaying screen, the left channel volume is amplified and the right channel volume is reduced; and when the user is at the center but away from the displaying screen, the left and the right channel volumes are reduced simultaneously.

In this embodiment, when the user is within the optimal viewing distance, the size of the object in the holographic scene along the z-axis direction and the region of the object in the holographic scene in the holographic three-dimensional display that can be covered by the sight of the human eyes are adjusted according to the distance between the eyes and the displaying screen, and different individual holographic sounds corresponding to the left ear and the right ear are output respectively. This makes the effect realistic and improves user experiences.

Figure 7:
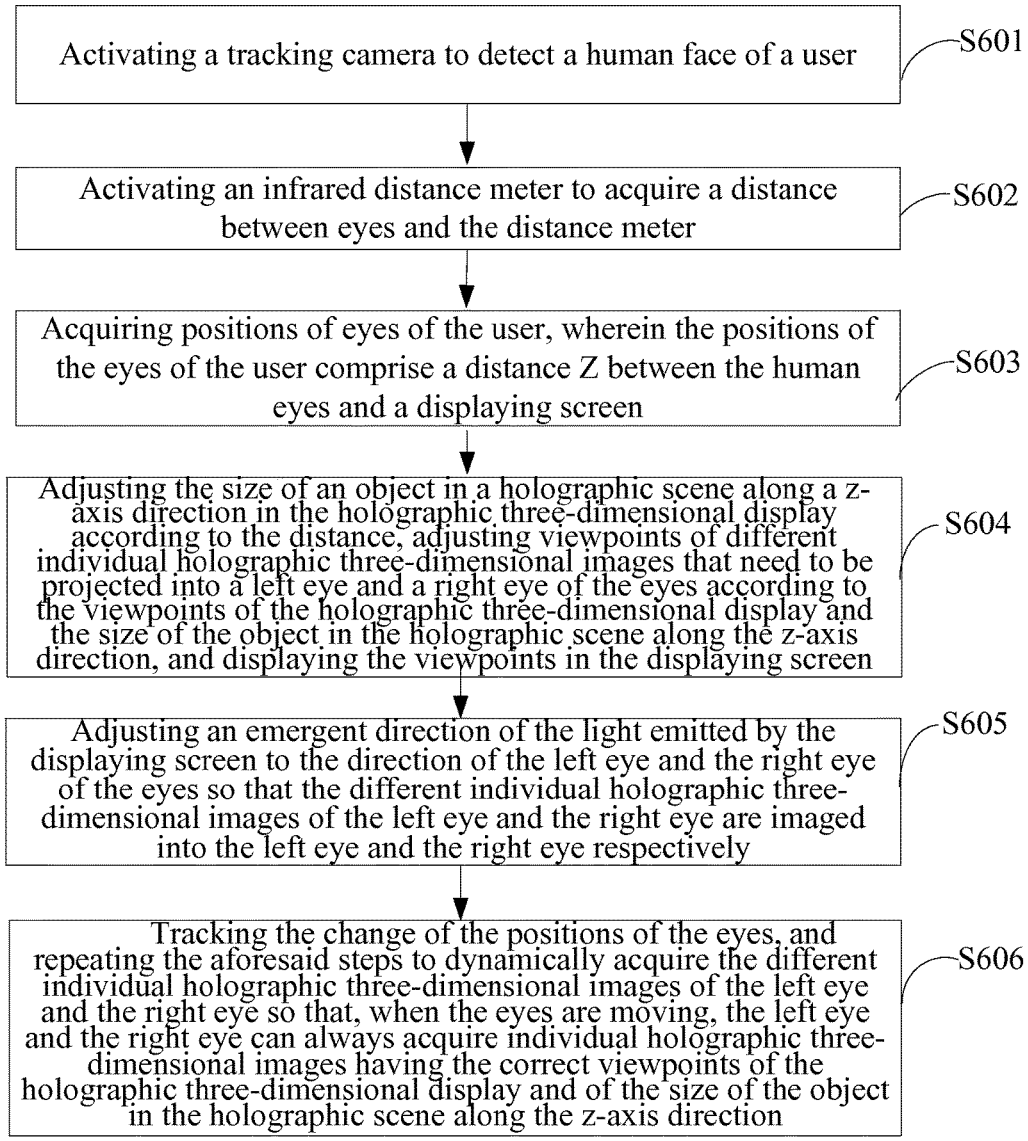
FIG. 7 is a schematic flowchart diagram of a distance adaptive holographic displaying method based on eyeball tracking according to a fourth embodiment of the present disclosure.

Referring to FIG. 7, FIG. 7 is a schematic flowchart diagram of a distance adaptive holographic displaying method based on eyeball tracking according to a fourth embodiment of the present disclosure. The present disclosure provides an individual holographic three-dimensional displaying method which comprises the following steps of:

S601: activating a tracking camera to detect a human face of a user.

After the device is powered on, the tracking camera is activated to detect the human face of the user so as to preliminarily determine the position of the user.

S602: activating an infrared distance meter to acquire a distance between eyes and the distance meter.

The infrared distance meter is activated either simultaneously or not so as to acquire the distance between the eyes and the distance meter.

S603: acquiring positions of eyes of the user, wherein the positions of the eyes of the user comprise a distance Z between the human eyes and a displaying screen.

A coordinate system is established in a way similar to that of the first embodiment and thus will not be further described herein. According to the images acquired in the step S601, the human face is detected to find features of the human eyes so as to acquire the positions of the human eyes. According to the distance between the eyes and the distance meter acquired in the step S602, the distance Z between the eyes and the displaying screen is obtained.

S604: adjusting the size of an object in a holographic scene along a z-axis direction in the holographic three-dimensional display according to the distance, adjusting viewpoints of different individual holographic three-dimensional images that need to be projected into a left eye and a right eye of the eyes according to the size of the object in the holographic scene along the z-axis direction, and displaying the viewpoints in the displaying screen.

The distance Z between the user and the displaying screen is acquired according to the step S604, and the size of the object in the holographic scene along the z-axis direction in the holographic three-dimensional display is adjusted according to the distance Z. For example, the change of the distance Z is determined so that, when the viewing distance is getting larger, the size of the object in the holographic scene along the z-axis direction in the holographic three-dimensional display is reduced; and otherwise, the size of the object in the holographic scene along the z-axis direction in the holographic three-dimensional display is enlarged. The viewpoints of different individual holographic three-dimensional images that need to be projected into a left eye and a right eye of the eyes are adjusted according to the size of the object in the holographic scene along the z-axis direction and are displayed in the displaying screen.

S605: adjusting an emergent direction of the light emitted by the displaying screen to the direction of the left eye and the right eye of the eyes so that the different individual holographic three-dimensional images of the left eye and the right eye are imaged into the left eye and the right eye respectively.

S606: tracking the change of the positions of the eyes, and repeating the aforesaid steps to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction.

Figure 8:
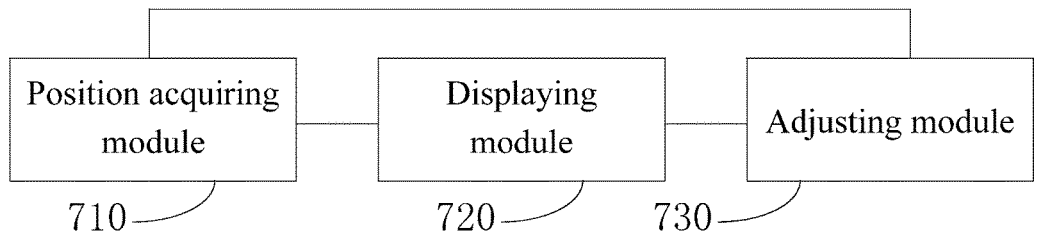
FIG. 8 is a schematic structural view of a distance adaptive holographic displaying device based on eyeball tracking according to an embodiment of the present disclosure.

Referring to FIG. 8, FIG. 8 is a schematic structural view of a distance adaptive holographic displaying device based on eyeball tracking according to an embodiment of the present disclosure. The present disclosure provides a distance adaptive holographic displaying device based on eyeball tracking, which comprises a position acquiring module 710, a displaying module 720 and an adjusting module 730. The displaying module 720 is connected to the position acquiring module 710 and the adjusting module 730 respectively.

The position acquiring module 710 is configured to detect a human face of a user and acquire positions of eyes of the user, wherein the positions of the eyes of the user comprise a distance between the eyes and a displaying screen.

The displaying module 720 is configured to adjust the size of an object in a holographic scene along a z-axis direction in the holographic three-dimensional display according to the distance acquired by the position acquiring module 710, to adjust viewpoints of different individual holographic three-dimensional images that need to be projected into a left eye and a right eye of the eyes according to the size of the object in the holographic scene along the z-axis direction, and to display the viewpoints in the displaying screen. For specific adjustment operations at different positions, reference may be made to descriptions of FIG. 10 and these will not be further described herein.

The adjusting module 730 is configured to adjust an emergent direction of the light emitted by the displaying screen to the direction of the left eye and the right eye of the eyes so that the different individual holographic three-dimensional images of the left eye and the right eye are imaged into the left eye and the right eye respectively.

The position acquiring module 710 is further configured to track the positions of the eyes, and the displaying module 720 adjusts the different individual holographic three-dimensional images of the left eye and the right eye dynamically so that, when the eyes are moving, the left eye and the right eye can always acquire individual holographic three-dimensional images having the correct viewpoints of the holographic three-dimensional display and of the size of the object in the holographic scene along the z-axis direction by means of the adjusting module 730.

Figure 9:
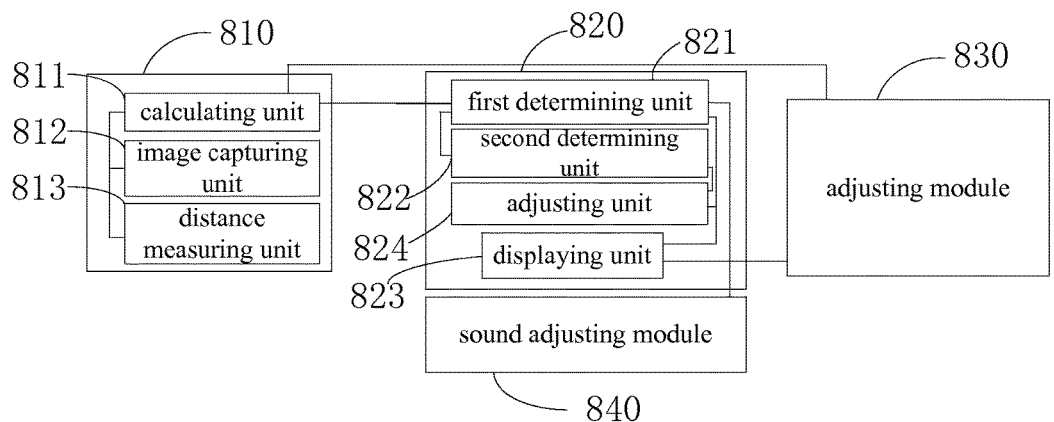
FIG. 9 is a schematic structural view of a distance adaptive holographic displaying device based on eyeball tracking according to another embodiment of the present disclosure.

Referring to FIG. 9, FIG. 9 is a schematic structural view of a distance adaptive holographic displaying device based on eyeball tracking according to another embodiment of the present disclosure. The present disclosure provides a distance adaptive holographic displaying device based on eyeball tracking, which comprises a position acquiring module 810, a displaying module 820, an adjusting module 830 and a sound adjusting module 840. The position acquiring module 810 further comprises a calculating unit 811, an image capturing unit 812 and a distance measuring unit 813. The displaying module 820 comprises a first determining unit 821, a second determining unit 822, a displaying unit 823 and an adjusting unit 824. The calculating unit 811 is connected to the image capturing unit 812, the distance measuring unit 813, the adjusting module 830 and the first determining unit 821 respectively. The first determining module 821 is further connected to the second determining unit 822, the sound adjusting module 840 and the displaying unit 823, and the displaying module 820 is further connected to the adjusting module 830.

The image capturing unit 812 is configured to detect a human face of a user, and the distance measuring unit 813 is configured to measure the distance between the human eyes and the distance measuring unit 813 and transmit the measured data to the calculating unit 811 so as to calculate the position of the human eyes.

The calculating unit 811 is configured to acquire, according to the data obtained by detecting the human face by the image capturing unit 812, the following coordinate values corresponding to the eyeballs of the eyes: $(x_{L1}, y_{L1})$ and $(x_{R1}, y_{R1})$, $(x_{L2}, y_{L2})$ and $(x_{R2}, y_{R2})$, . . . , $(x_{Ln}, y_{Ln})$ and $(x_{Rn}, y_{Rn})$, wherein L represents the left eye, R represents the right eye, n represents that the eyes move from position 1 to position n, the xy coordinate plane is parallel to the surface of the displaying screen, and a three-dimensional standard coordinate system is adopted; and acquire a distance Z between the eyes and the displaying screen according to a distance between the distance measuring unit 813 and the eyes measured by the distance measuring unit 813, a coordinate value of the distance measuring unit 813 in the coordinate system, and coordinate values corresponding to the eyeballs of the eyes; or acquire the distance Z between the eyes and the displaying screen according to the distance between the distance measuring unit 813 and the eyes, and an angle of an optical axis of the distance measuring unit 813 with respect to a plane of the displaying screen; or directly take the distance between the distance measuring unit 813 and the eyes as the distance Z between the eyes and the displaying screen.

The coordinate system can be established in the same way as that of the individual holographic three-dimensional displaying method according to the first embodiment of the present disclosure, and thus will not be further described herein.

The displaying module 820 is configured to adjust the size of an object in a holographic scene along a z-axis direction in the holographic three-dimensional display according to the distance Z acquired by the position acquiring module 810, to adjust viewpoints of different individual holographic three-dimensional images that need to be projected into a left eye and a right eye of the eyes according to the size of the object in the holographic scene along the z-axis direction, and to display the viewpoints in the displaying screen. For specific adjustment operations at different positions, reference may be made to descriptions of FIG. 10 and these will not be further described herein.

The adjusting module 830 is configured to adjust an emergent direction of the light emitted by the displaying screen to the direction of the left eye and the right eye of the eyes so that the different individual holographic three-dimensional images of the left eye and the right eye are imaged into the left eye and the right eye respectively.

The first determining unit 821 is configured to determine whether the distance Z between the eyes and the displaying screen is getting larger or smaller; if the distance Z between the eyes and the displaying screen is getting larger, then the adjusting unit 824 is controlled to reduce the size of the object in the holographic scene along the z-axis direction in the holographic three-dimensional display; and otherwise, the adjusting unit 824 is controlled to enlarge the size of the object in the holographic scene along the z-axis direction in the holographic three-dimensional display.

The second determining unit 822 is configured to determine whether the distance Z between the eyes and the displaying screen is smaller than a first threshold value, and if the distance Z between the eyes and the displaying screen is smaller than the first threshold value, then the distance is getting smaller, and the adjusting unit 824 is controlled not to enlarge the size of the object in the holographic scene along the z-axis direction in the holographic three-dimensional display; and the second determining unit 822 is further configured to determine whether the distance Z between the eyes and the displaying screen is larger than a second threshold value, and if the distance is larger than the second threshold value, then the distance is getting larger, and the adjusting unit 824 is controlled not to reduce the size of the object in the holographic scene along the z-axis direction in the holographic three-dimensional display.

The adjusting unit 824 is configured to adjust the size of an object in a holographic scene along a z-axis direction in the holographic three-dimensional display and the content of the object in the holographic scene in the holographic three-dimensional display according to the determination result of the first determining module 821, wherein the content of the object in the holographic scene is the appearance content of the object within the region of the object that can be covered by the sight of the both human eyes.

The position acquiring module 810 is further configured to track the positions of the eyes, and the displaying module 820 adjusts the different individual holographic three-dimensional images of the left eye and the right eye dynamically so that, when the eyes are moving, the left eye and the right eye can always acquire individual holographic three-dimensional images having the correct viewpoints of the holographic three-dimensional display and of the size of the object in the holographic scene along the z-axis direction by means of the adjusting module 830.

The sound adjusting module 840 is configured to adjust different individual holographic sounds that need to be projected into a left ear and a right ear of ears according to the viewpoints of the holographic three-dimensional display and the size of the object in the holographic scene along the z-axis direction, and to output the different individual holographic sounds corresponding to the left ear and the right ear respectively. The sound at a side of the displaying screen that is closer to the user is amplified, while the sound at the other side of the displaying screen that is far away from the user is reduced.

What described above are only some of the embodiments of the present disclosure, which are provided to facilitate understanding of the present disclosure but are not intended to limit the technical solutions of the present disclosure in any way or to exhaust all embodiments of the present disclosure. Accordingly, any modification or equivalent substitutions made to the technical solutions without departing from the spirits and scope of the present disclosure shall all be covered within the scope of the present disclosure.

What is claimed is:

1. A distance adaptive holographic displaying method based on eyeball tracking, the distance adaptive holographic displaying method applied in a distance adaptive holographic displaying device comprising a camera and a distance meter; the distance adaptive holographic displaying method comprising the following steps of:

controlling the camera to track change of positions of eyes of a user, moving the distance meter together with the camera to measure a distance between the eyes and the distance meter, and calculating a distance between the eyes and a displaying screen of the device;

adjusting the size of an object in a holographic scene along a z-axis direction in the holographic three-dimensional display according to the distance between the eyes and the displaying screen, adjusting viewpoints of different individual holographic three-dimensional images that need to be projected into a left eye and a right eye of the eyes according to the size of the object in the holographic scene along the z-axis direction, and displaying the viewpoints in the displaying screen;

adjusting an emergent direction of the light emitted by the displaying screen to the direction of the left eye and the right eye of the eyes so that the different individual holographic three-dimensional images of the left eye and the right eye are imaged into the left eye and the right eye respectively; and tracking the change of the positions of the eyes, and repeating the aforesaid steps to dynamically acquire the different individual holographic three-dimensional images of the left eye and the right eye so that, when the eyes are moving, the left eye and the right eye can always acquire individual holographic three-dimensional images having the correct viewpoints of the holographic three-dimensional display and of the size of the object in the holographic scene along the z-axis direction;

wherein if the distance between the eyes and the displaying screen is smaller than a first threshold value, the size of the object in the holographic scene is not enlarged along the z-axis direction; and if the distance between the eyes and the display screen is larger than a second threshold value, the size of the object in the holographic scene is not reduced along the z-axis direction.

2. The method of claim 1, wherein adjusting the size of an object in a holographic scene along a z-axis direction in the holographic three-dimensional display according to the distance further comprises adjusting the content of the object in the holographic scene in the holographic three-dimensional display, wherein the content of the object in the holographic scene is the appearance content of the object within a region of the object that can be covered by the sight of the both human eyes, and the step of adjusting the size of an object in a holographic scene along a z-axis direction in the individual holographic three-dimensional display according to the distance comprises the following steps of:

determining whether the distance is getting larger or smaller; and if the distance is getting larger, reducing the size of the object in the holographic scene along the z-axis direction in the holographic three-dimensional display, and meanwhile, enlarging the region of the object that can be covered by the sight of the both human eyes so as to obtain the content of the object in the holographic scene in the adjusted holographic three-dimensional display; and otherwise, enlarging the size of the object in the holographic scene along the z-axis direction in the holographic three-dimensional display, and meanwhile, reducing the region of the object that can be covered by the sight of the both human eyes so as to obtain the content of the object in the holographic scene in the adjusted holographic three-dimensional display.

3. The method of claim 2, wherein the step of determining whether the distance is getting larger or smaller further comprises the following steps of: determining whether the distance is smaller than a first threshold value, and if the distance is smaller than the first threshold value, then the distance is getting smaller, and the size of the object in the holographic scene along the z-axis direction in the holographic three-dimensional display will not be enlarged and the content of the object in the holographic scene in the holographic three-dimensional display will not be adjusted; and determining whether the distance is larger than a second threshold value, and if the distance is larger than the second threshold value, then the distance is getting larger, and the size of the object in the holographic scene along the z-axis direction in the holographic three-dimensional display will not be reduced and the content of the object in the holographic scene in the holographic three-dimensional display will not be adjusted.

4. The method of claim 1, wherein a three-dimensional standard coordinate system is established by taking a center of the displaying screen as an origin, with a xy coordinate plane being parallel to the displaying screen, a positive direction of a x-axis being horizontal and directed to a right direction, a positive direction of a y-axis being vertical to the x-axis and directed downwards, and a positive direction of the z-axis being perpendicular to the xy coordinate plane and directed towards a direction of the human eyes;
  when the eyes are moving, each of the distances is acquired in the following way:
  acquiring, according to data obtained by detecting the human face, the following coordinate values corresponding to the eyeballs of the eyes: $(x_{L1}, y_{L1})$ and $(x_{R1}, y_{R1})$, $(x_{L2}, y_{L2})$ and $(x_{R2}, y_{R2})$, . . . , $(x_{Ln}, y_{Ln})$ and $(x_{Rn}, y_{Rn})$, wherein L represents the left eye, R represents the right eye, n represents that the eyes move from position 1 to position n, and a three-dimensional standard coordinate system is adopted; and
  acquiring a distance Z between the eyes and the displaying screen according to a distance between the distance meter and the eyes measured by the distance meter when the eyes are moving, a coordinate value of the distance meter in the coordinate system, and coordinate values corresponding to the eyeballs of the eyes; or acquiring the distance Z between the eyes and the displaying screen according to the distance between the distance meter and the eyes, and an angle of an optical axis of the distance meter with respect to a plane of the displaying screen; or directly taking the distance between the distance meter and the eyes as the distance Z between the eyes and the displaying screen.

5. The method of claim 1, further comprising the following step of:
  acquiring different individual holographic sounds that need to be projected into a left ear and a right ear of ears according to the viewpoints of the holographic three-dimensional display and the size of the object in the holographic scene along the z-axis direction, and outputting the different individual holographic sounds corresponding to the left ear and the right ear respectively.

6. A distance adaptive holographic displaying device based on eyeball tracking, comprising:
  a camera, controlled to track change of positions of eyes of a user;
  a distance meter, moved together with the camera to measure a distance between the eyes and the distance meter for a calculation of a distance between the eyes and the displaying screen of the displaying device;
  a displaying module, being configured to adjust the size of an object in a holographic scene along a z-axis direction in the holographic three-dimensional display according to the distance, to adjust viewpoints of different individual holographic three-dimensional images that need to be projected into a left eye and a right eye of the eyes according to the size of the object in the holographic scene along the z-axis direction, and to display the viewpoints in the displaying screen; and
  an adjusting module, being configured to adjust an emergent direction of the light emitted by the displaying screen to the direction of the left eye and the right eye of the eyes so that the different individual holographic three-dimensional images of the left eye and the right eye are imaged into the left eye and the right eye respectively;
  wherein the displaying module adjusts the different individual holographic three-dimensional images of the left eye and the right eye dynamically so that, when the eyes are moving, the left eye and the right eye can always acquire individual holographic three-dimensional images having the correct viewpoints of the holographic three-dimensional display and of the size of the object in the holographic scene along the z-axis direction by means of the adjusting module;
  wherein if the distance between the eyes and the displaying screen is smaller than a first threshold value, the displaying module does not enlarge the size of the object in the holographic scene along the z-axis direction; and if the distance between the eyes and the displaying screen is larger than a second threshold value, the displaying module does not reduce the size of the object in the holographic scene.

7. The device of claim 6, wherein the displaying module comprises a displaying unit, an adjusting unit and a first determining unit, and the adjusting unit is configured to adjust the size of an object in a holographic scene along a z-axis direction in the holographic three-dimensional display and the content of the object in the holographic scene in the holographic three-dimensional display according to the distance, wherein the content of the object in the holographic scene is the appearance content of the object within a region of the object that can be covered by the sight of the both human eyes;
  the first determining unit is configured to determine whether the distance is getting larger or smaller;
  if the first determining unit determines that the distance is getting larger, the adjusting unit is controlled to reduce the size of the object in the holographic scene along the z-axis direction in the holographic three-dimensional display, and meanwhile, enlarge the region of the object that can be covered by the sight of the both human eyes so as to obtain the content of the object in the holographic scene in the adjusted holographic three-dimensional display; and otherwise, the adjusting unit is controlled to enlarge the size of the object in the holographic scene along the z-axis direction in the holographic three-dimensional display, and meanwhile, reduce the region of the object that can be covered by the sight of the both human eyes so as to obtain the content of the object in the holographic scene in the adjusted holographic three-dimensional display; and
  the displaying unit is configured to display the holographic three-dimensional image adjusted by the adjusting unit.

8. The device of claim 7, wherein the displaying module further comprises a second determining unit configured to determine whether the distance is smaller than a first threshold value, and if the distance is smaller than the first threshold value, then the distance is getting smaller, and the adjusting unit is controlled neither to enlarge the size of the object in the holographic scene along the z-axis direction in the holographic three-dimensional display nor to adjust the content of the object in the holographic scene in the holographic three-dimensional display; and the second determining unit is further configured to determine whether the distance is larger than a second threshold value, and if the distance is larger than the second threshold value, then the distance is getting larger, and the adjusting unit is controlled neither to reduce the size of the object in the holographic scene along the z-axis direction in the holographic three-dimensional display nor to adjust the content of the object in the holographic scene in the holographic three-dimensional display.

9. The device of claim 6, further comprising a calculating unit, wherein the calculating unit is specifically configured to:
  establish a three-dimensional standard coordinate system by taking a center of the displaying screen as an origin, with a xy coordinate plane being parallel to the displaying screen, a positive direction of a x-axis being horizontal and directed to a right direction, a positive direction of a y-axis being vertical to the x-axis and directed downwards, and a positive direction of the z-axis being perpendicular to the xy coordinate plane and directed towards a direction of the human eyes;
  acquire, according to data obtained by detecting the human face by the image capturing unit, the following coordinate values corresponding to the eyeballs of the eyes: $(x_{L1}, y_{L1})$ and $(x_{R1}, y_{R1})$, $(x_{L2}, y_{L2})$ and $(x_{R2}, y_{R2})$, ..., $(x_{Ln}, y_{Ln})$ and $(x_{Rn}, y_{Rn})$, wherein L represents the left eye, R represents the right eye, n represents that the eyes move from position 1 to position n, the xy coordinate plane is parallel to the surface of the displaying screen, and a three-dimensional standard coordinate system is adopted; and
  acquire a distance Z between the eyes and the displaying screen according to a distance between the distance meter and the eyes measured by the distance meter when the eyes are moving, a coordinate value of the distance meter in the coordinate system, and coordinate values corresponding to the eyeballs of the eyes; or acquire the distance Z between the eyes and the displaying screen according to the distance between the distance meter and the eyes, and an angle of an optical axis of the distance meter with respect to a plane of the displaying screen; or directly take the distance between the distance meter and the eyes as the distance Z between the eyes and the displaying screen.

10. The device of claim 6, further comprising a sound adjusting module specifically configured to adjust different individual holographic sounds that need to be projected into a left ear and a right ear of ears according to the viewpoints of the holographic three-dimensional display and the size of the object in the holographic scene along the z-axis direction, and to output the different individual holographic sounds corresponding to the left ear and the right ear respectively.

* * * * *